United States Patent [19]

Feldman

[11] 4,327,002

[45] Apr. 27, 1982

[54] HIGH NITRILE COPOLYMER RESINS CONTAINING EPOXIDIZED OIL FOR IMPROVED IMPACT RESISTANCE

[75] Inventor: Daniel W. Feldman, Beachwood, Ohio

[73] Assignee: The Standard Oil Company, Cleveland, Ohio

[21] Appl. No.: 106,972

[22] Filed: Dec. 26, 1979

[51] Int. Cl.$^3$ .......................... C08L 9/04; C08L 9/08; C08L 91/00

[52] U.S. Cl. ................................ 524/114; 525/230; 525/295; 525/310; 524/458

[58] Field of Search .................. 525/310; 260/18 PF, 260/23 EP, 23.7 N, 23.7 M

[56] References Cited

U.S. PATENT DOCUMENTS

| | | | |
|---|---|---|---|
| 3,426,102 | 2/1969 | Solak et al. ........................ | 525/310 |
| 3,856,728 | 12/1974 | Abramoff ....................... | 260/23.7 N |
| 3,891,722 | 6/1975 | Miloscia et al. ................... | 525/310 |
| 3,991,135 | 11/1976 | Kraft et al. ...................... | 260/23 EP |
| 4,151,132 | 4/1979 | Khanna .......................... | 260/23 EP |
| 4,151,151 | 4/1979 | Isley ................................. | 525/310 |

FOREIGN PATENT DOCUMENTS

| | | | |
|---|---|---|---|
| 46-27068 | 8/1971 | Japan .................... | 525/310 |
| 48-28335 | 8/1973 | Japan ............... | 260/18 PF |
| 50-105750 | 8/1975 | Japan ............. | 260/23.7 N |
| 1062477 | 3/1967 | United Kingdom ............... | 525/310 |

*Primary Examiner*—Ronald W. Griffin
*Attorney, Agent, or Firm*—William D. Mooney; Herbert D. Knudsen; Larry W. Evans

[57] ABSTRACT

High nitrile copolymers are rendered impact resistant by inclusion therein of small amounts of epoxidized vegetable oils.

6 Claims, No Drawings

HIGH NITRILE COPOLYMER RESINS CONTAINING EPOXIDIZED OIL FOR IMPROVED IMPACT RESISTANCE

This invention relates to improvement of the impact resistance of thermoplastic copolymers of olefinic nitriles and more particularly pertains to impact-resistant thermoplastic high nitrile copolymer compositions which contain small amounts of certain epoxidized vegetable oils which serve as impact improvers.

According to my invention, certain epoxidized vegetable oils are dispersed in a weight ratio within about 0.1 to 20 parts by weight, and preferably from about 1 to 10 parts by weight, based on 100 parts by weight of high nitrile copolymer to form thermoplastic compositions having improved impact resistance. The resulting novel mixtures also have excellent physical properties.

Although epoxidized vegetable oils have been used as plasticizers in other resins, it is indeed unobvious and unexpected that these materials function as impact improvers in the present invention.

The copolymers of olefinic nitriles useful in this invention are those proposed by polymerizing a major proportion of a monounsaturated nitrile, such as acrylonitrile, and a minor proportion of another monovinyl monomer component copolymerizable with said nitrile in an aqueous medium in the presence of a diene monomer.

The conjugated diene monomers useful in the present invention include butadiene, isoprene, chloroprene, bromoprene, cyanoprene, 2,3-dimethyl-butadiene, 2-ethyl butadiene, 2,3-diethyl-butadiene, and the like. Most preferred for the purposes of this invention are butadiene and isoprene because of their ready availability and their excellent copolymerization properties.

The olefinically unsaturated nitriles useful in this invention are the alpha-beta-olefinically unsaturated mononitriles having the structure

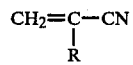

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles are acrylonitrile and methacrylonitrile and mixtures thereof.

The other monovinyl monomer components copolymerizable with the olefinically unsaturated nitriles which are useful in this invention include one or more of the vinyl aromatic monomers, esters of olefinically unsaturated carboxylic acids, vinyl esters, vinyl ethers, alpha-olefins, indene, and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

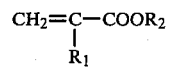

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred are methyl acrylate, ethyl acrylate, methyl methacrylate, and ethyl methacrylate.

The alpha-olefins useful in the present invention are those having at least 4 and an many as 10 carbon atoms having the structure

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers useful in this invention include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers and the butyl vinyl ethers.

Vinyl esters useful in this invention include vinyl acetate, vinyl propionate, the vinyl butyrates, and the like. Most preferred is vinyl acetate.

The polymers useful in this invention are those prepared by the polymerization of 100 parts by weight of (A) from 60 to 90% by weight of at least one nitrile having the structure

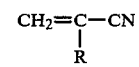

wherein R has the foregoing designation and (B) from 10 to 40% by weight based on the combined weight of (A) plus (B) of at least one member selected from the group consisting of (1) styrene, (2) an ester having the structure

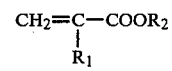

wherein $R_1$ and $R_2$ have the foregoing designations, (3) an alpha-olefin having the structure

wherein R' and R" have the foregoing designations, (4) a vinyl ether selected from the group consisting of methyl vinyl ether, ethyl vinyl ether, the propyl vinyl ethers, and the butyl vinyl ethers, (5) vinyl acetate, and (6) indene, in the presence of from 1 to 40 parts by weight of (C) a rubbery polymer of a conjugated diene monomer selected from the group consisting of butadiene and isoprene, and optionally at least one comonomer selected from the group consisting of styrene, a nitrile monomer having the structure $$CH_2=C-CN \atop R$$

wherein R has the foregoing designation, and an ester having the structure $$CH_2=C-COOR_2 \atop R_1$$

wherein $R_1$ and $R_2$ have the foregoing designations, said rubbery polymer containing from 50 to 100% by weight of polymerized conjugated diene and from 0 to 50% by weight of comonomer.

The epoxidized vegetable oils useful in the present invention include epoxidized soybean oil, epoxidized linseed oil, epoxidized butyl linseed oil, and others. Most preferred is epoxidized butyl linseed oil.

The epoxidized vegetable oils can be dispersed in the nitrile copolymer resins of this invention in any one of a number of ways which are well known to those skilled in the art. The dispersions can be made in an extruder, an internal mixer such as a Banbury or Brabender, and the dispersion can also be made by adding the epoxidized vegetable oil to the polymer latex, dispersion or solution. Dispersions can also be made by adding the epoxidized vegetable oil to the powdered resin in a high speed mixer.

The compositions produced by following the disclosure of the present invention are useful thermoplastic materials which can be molded into containers, pipes, rods, films, sheets, fibers, and the like, to be used for packaging, storing, and transporting solids, liquids and gases of various types.

This invention is further illustrated in the following examples wherein the amounts of ingredients are expressed in parts by weight unless otherwise indicated.

EXAMPLE 1

A nitrile rubber-modified copolymer of 75% by weight of acrylonitrile and 25% by weight of methyl acrylate was prepared according to the procedure of Example VIII of U.S. Pat. No. 3,426,102.

EXAMPLE 2

Some of the polymer described in Example 1 was milled on a rubber mill and varying amounts of epoxidized butyl linseed oil were incorporated into the polymer on the mill. Each sample was compression molded into a test bar and notched Izod impact strength was determined. The results are shown in Table 1.

TABLE 1

| epoxidized butyl linseed oil | 0 | 0.3% | 0.6% | 1.2% |
|---|---|---|---|---|
| notched Izod impact strength (foot pounds per inch of notch) | 3.54 | 4.21 | 5.89 | 6.96 |

EXAMPLE 3

The procedure of Example 1 was repeated except that the epoxidized butyl linseed oil was added to the resin crumb prior to the densification of the mixture in a screwtype extruder. Twenty-ounce bottles were blown from the resin. They were filled with water and drop height was determined. The results obtained are shown in Table 2.

TABLE 2

| epoxidized butyl linseed oil | 0 | 0.5% | 1.0% | 1.5% |
|---|---|---|---|---|
| room-temperature drop height | 5.5 feet | 14.9 feet | 18.0 feet | 18.1 feet |
| 0° F. drop height | 3.2 feet | Not tested | Not tested | 4.7 feet |

EXAMPLE 4

The procedure of Example 3 was repeated except that one-gallon bottles were made for the drop-height tests. The control bottles (no added epoxidized butyl linseed oil) had a room-temperature drop height of 5.4 feet whereas the bottles made from resin containing 1% of epoxidized butyl linseed oil had a room-temperature drop height of 9.9 feet.

I claim:

1. The composition which comprises an intimate mixture of 100 parts by weight of
(I) a polymer prepared by the polymerization in an aqueous medium of 100 parts by weight of
  (A) from 60 to 90% by weight of at least one nitrile having the structure $$CH_2=C-CN \atop R$$

wherein R is hydrogen, a lower alkyl group having from 1 to 4 carbon atoms, or a halogen, and
  (B) from 10 to 40% by weight based on the combined weight of (A) plus (B) of at least one member selected from the group consisting of
    (1) styrene,
    (2) an ester having the structure $$CH_2=C-COOR_2 \atop R_1$$

wherein $R_1$ is hydrogen, an alkyl group having from 1 to 4 carbon atoms, or a halogen, and $R_2$ is an alkyl group having from 1 to 6 carbon atoms,
    (3) an alpha-olefin having the structure $$CH_2=C {\atop R''}^{R'}$$

wherein R' and R" are alkyl groups having from 1 to 7 carbon atoms,
    (4) a vinyl ether selected from the group consisting of methyl vinyl ether, ethyl vinyl ether, the propyl vinyl ethers, and the butyl vinyl ethers,
    (5) vinyl acetate, and
    (6) indene,
  in the presence of from 1 to 40 parts by weight of
  (C) a rubbery polymer of a conjugated diene monomer selected from the group consisting of butadiene and isoprene and from 0 to 50% by weight of at least one comonomer selected from the group consisting of styrene, a nitrile monomer having the structure

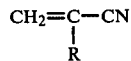

wherein R has the foregoing designation, and an ester having the structure

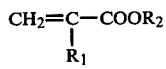

wherein $R_1$ and $R_2$ have the foregoing designations, and from about 0.1 to 20 parts by weight of (II) at least one member selected from the group consisting of epoxidized soybean oil, epoxidized linseed oil, and epoxidized butyl linseed oil.

2. The composition of claim 1 wherein (A) is a member selected from the group consisting of acrylonitrile and methacrylonitrile.

3. The composition of claim 2 wherein (A) is acrylonitrile.

4. The composition of claim 3 wherein (B) is methyl acrylate.

5. The composition of claim 4 wherein (C) is a butadiene-acrylonitrile copolymer.

6. The composition of claim 5 wherein (II) is epoxidized butyl linseed oil.

* * * * *